(12) United States Patent
Geck et al.

(10) Patent No.: US 7,250,127 B2
(45) Date of Patent: Jul. 31, 2007

(54) PELLETIZED ORGANOPOLYSILOXANE MATERIAL

(75) Inventors: Michael Geck, Burghausen (DE); Peter Jerschow, Burghausen (DE); Gerhard Staiger, Kirchdorf (DE); Oliver Fuhrmann, Kienberg (DE)

(73) Assignee: Wacker Chemie AG, Munich (DE)

( * ) Notice: Subject to any disclaimer, the term of this patent is extended or adjusted under 35 U.S.C. 154(b) by 291 days.

(21) Appl. No.: 10/877,285

(22) Filed: Jun. 25, 2004

(65) Prior Publication Data

US 2005/0004296 A1    Jan. 6, 2005

(30) Foreign Application Priority Data

Jul. 4, 2003   (DE) ................... 103 30 287

(51) Int. Cl.
   *B29B 9/02*   (2006.01)
(52) U.S. Cl. .............. 264/142; 524/405; 524/588; 524/268; 528/499; 525/477
(58) Field of Classification Search .............. None
   See application file for complete search history.

(56) References Cited

U.S. PATENT DOCUMENTS

| 5,346,941 A | 9/1994 | Furukawa et al. |
| 5,391,594 A | 2/1995 | Romenesko et al. |
| 5,840,831 A | 11/1998 | Hamachi et al. |
| 6,441,086 B1 | 8/2002 | Wolfer et al. |

FOREIGN PATENT DOCUMENTS

| DE | 38 39 900 | 5/1990 |
| DE | 199 04 510 A1 | 8/2000 |
| EP | 0 570 978 B1 | 9/1996 |
| EP | 1 028 140 | 8/2000 |

OTHER PUBLICATIONS

English Derwent Abstract AN 2000-544537 [50] corresponding to DE 199 04 510 A1.
English Derwent Abstract (AN 1990-172169) [23] corres. to DE 38 39 900.
English Derwent Abstract (AN 2000-544537) [50] corres. to EP 1 028 140.

*Primary Examiner*—Marc S. Zimmer
(74) *Attorney, Agent, or Firm*—Brooks Kushman P.C.

(57) ABSTRACT

The invention relates to a pelletized organopolysiloxane material, to a process for producing the pelletized material, and to the use of the pelletized organopolysiloxane material as an additive for thermoplastics.

19 Claims, No Drawings

PELLETIZED ORGANOPOLYSILOXANE MATERIAL

BACKGROUND OF THE INVENTION

1. Field of the Invention

The invention relates to a pelletized organopolysiloxanes, to a process for their preparation, and to their use as an additive for thermoplastics.

2. Background Art

Silicone-based monomers and polymers are increasingly used in the plastics industry, from polymer preparation through polymer compounding and final product manufacture. By way of example, low-molecular-weight organopolysiloxanes with viscosities up to 1000 mm²/s are widely used in the plastics industry as external mold-release agents. Relatively high-molecular-weight organopolysiloxanes in the viscosity range from 10,000 to 100,000 mm²/s have been used for about 30 years as internal additives in thermoplastic polymer to provide processing advantages and improvements in surface properties, among which, by way of example, are low coefficient of friction, better slip properties, better abrasion resistance, better wear values, better scratch resistance and surface gloss, better demoldability, lower rejection rate, easier processing, better throughput, lower energy consumption during processing, and faster cycle times in shaping processes.

In addition, organopolysiloxanes have better stability than conventional processing aids and lubricants, for example, waxes and fatty acid derivatives. Ultrahigh-molecular-weight organopolysiloxanes with viscosities of from 1,000,000 to 100,000,000 mm²/s have additive properties comparable to those of relatively high-molecular-weight organopolysiloxanes, generally with better effectiveness and higher efficiency. This improved property profile is attributed to a higher level of mechanical interaction between the long-chain ultrahigh-molecular-weight organopolysiloxanes and the polymer chains of the thermoplastics, and results in greater permanency, reduced migration, and better printability, adhesive properties, and weldability.

However, liquid organopolysiloxane additives, especially those with relatively high viscosities, have the disadvantage that their introduction into thermoplastic melts during the extrusion process is difficult, and in general, only achievable by use of specialized technical equipment. Extrusion processes preferably use solid constituents, most preferably in the form of conventional pelletized material. A disadvantage of solid constituents in powder form is that it is more difficult to manufacture homogeneous premixes in the form of dry blends from plastics pellets and pulverulent additives, and that such premixes, even when used, have greater susceptibility to segregation during storage and metering than premixes manufactured from two or more different pelletized materials. Segregation and irregular metering are problematic especially when pulverulent additives, the amounts of which are generally very small, are blended with pelletized polymer material. Non-uniform metering leads to inhomogeneous product quality, which is undesirable. For this reason, concentrates or masterbatches have been developed comprising relatively high-viscosity and ultrahigh-viscosity liquid organopolysiloxanes in the form of pellets. However, these organopolysiloxane concentrates have a number of disadvantages. For example, the organopolysiloxane content ranges only from 20% to a maximum of 50%, the remainder being a thermoplastic carrier material. The presence of such carrier materials limits the range of applications of the pelletized material, because the carrier has to be matched to the particular plastic to which the concentrate is added. In view of the wide variety of thermoplastics, this consequently requires providing a wide variety of concentrates of organopolysiloxane in different thermoplastic carriers. This is especially disadvantageous for plastics compounders or final processors who utilize a wide variety of different plastics and consequently have to inventory a correspondingly wide variety of organopolysiloxane concentrates.

Organopolysiloxane powders do not have the disadvantage of incorporation of different carrier materials. U.S. Pat. No. 5,346,941 describes pulverulent compositions comprising a liquid organopolysiloxane, silica, and a specific silicone resin, and its use for modifying thermoplastics. U.S. Pat. No. 5,391,594 describes compositions comprising a plastic and a silicone powder with a particle size of from 1 to 1000 μm which includes a polydiorganosiloxane and silica. However, pulverulent organopolysiloxane additives have the disadvantage, described at the outset, of segregation and inhomogeneity with pelletized materials. In the case of additives employed in small amounts, this is particularly undesirable, resulting in variable product quality.

SUMMARY OF THE INVENTION

It was an object of the invention to provide organopolysiloxane additives in solid form which are suitable for the industrial processing of thermoplastic materials, exhibit good additive properties, have a high concentration of organopolysiloxane, and which do not have the disadvantages of the conventional concentrate and powder supply forms. The inventive pelletized organopolysiloxane materials which are prepared employing a boric acid and water pelleting aid, achieve these and other objects.

DETAILED DESCRIPTION OF THE PREFERRED EMBODIMENT(S)

The invention therefore provides a pelletized organopolysiloxane material comprising (A) at least one polyorganosiloxane composed of units of the general formula I:

$$R_rSiO_{(4-r/2)} \qquad (I)$$

where
R independently of one another, are hydrogen or substituted or unsubstituted hydrocarbon radicals, and
r is 0, 1, 2 or 3, with the proviso that the average numerical value of r is in the range from 1.9 to 2.1, (B) from 1 to 200 parts by weight, based on 100 parts by weight of the polyorganosiloxane (A), of a reinforcing or non-reinforcing filler, or of a mixture of reinforcing or non-reinforcing fillers, (C) from 0.01 to 20 parts by weight, based on 100 parts by weight of the polyorganosiloxane (A) of at least one boric acid-containing additive for producing pellets, and (D) optionally, other auxiliaries such as processing aids, plasticizers, pigments, and stabilizers, whose pellet size is from 1 to 100 mm.

Examples of preferred radicals R are alkyl, aryl, alkylaryl, alkenyl, or cycloalkyl groups, optionally substituted, and which may be interrupted by heteroatoms, i.e. may contain heteroatom(s) in the carbon chains or rings.

Examples of hydrocarbon radicals R are alkyl radicals such as the methyl, ethyl, n-propyl, isopropyl, n-butyl, isobutyl, tert-butyl, n-pentyl, isopentyl, neopentyl and tertpentyl radicals, hexyl radicals such as the n-hexyl radical, heptyl radicals such as the n-heptyl radical, octyl radicals such as the n-octyl radical, and isooctyl radicals such as the 2,2,4-trimethylpentyl radical, nonyl radicals such as the n-nonyl radical, decyl radicals such as the n-decyl radical, dodecyl radicals such as the n-dodecyl radical, octadecyl radicals such as the n-octadecyl radical; cycloalkyl radicals such as the cyclopentyl, cyclohexyl and cycloheptyl radicals and methylcyclohexyl radicals; aryl radicals such as the phenyl, biphenyl, naphthyl, anthryl, and phenanthryl radicals; alkaryl radicals such as the o-, m- or p-tolyl radicals, xylyl radicals and ethylphenyl radicals; and aralkyl radicals such as the benzyl radical and the α- and the β-phenylethyl radicals.

Examples of substituted hydrocarbon radicals R are halogenated alkyl radicals such as the 3-chloropropyl radical, the 3,3,3-trifluoropropyl radical and the perfluorohexylethyl radical, and halogenated aryl radicals such as the p-chlorophenyl radical and the p-chlorobenzyl radical. Further examples of radicals R are the vinyl, allyl, methallyl, 1-propenyl, 1-butenyl and 1-pentenyl radicals, and the 5-hexenyl, butadienyl, hexadienyl, cyclopentenyl, cyclopentadienyl, cyclohexenyl, ethynyl, propargyl and 1-propynyl radicals.

In a further preferred embodiment according to the invention, the radicals R are alkenyl radicals having from 2 to 8 carbon atoms, most preferably the vinyl radical. The radicals R are preferably hydrogen atoms or hydrocarbon radicals having from 1 to 8 carbon atoms, most preferably the methyl radical. Among unsubstituted or substituted hydrocarbon radicals having from 1 to 8 carbon atoms particular preference is given to the methyl; vinyl, phenyl or 3,3,3-trifluoropropyl radical.

It is preferable for there to be alkyl radicals, in particular methyl radicals, bonded to at least 70 mol % of the Si atoms present in the polyorganosiloxane (A) composed of units of the formula (I). If the polyorganosiloxanes contain, besides Si-bonded methyl and/or 3,3,3-trifluoropropyl radicals, Si-bonded vinyl and/or phenyl radicals, the amounts of these latter are preferably from 0.001 to 30 mol %.

The polyorganosiloxanes (A) are preferably composed predominantly of diorganosiloxane units. The end groups of the polyorganosiloxanes may be trialkylsiloxy groups, in particular the trimethylsiloxy radical or the dimethylvinylsiloxy radical. However, it is also possible for one or more of these alkyl groups to have been replaced by hydroxy groups or alkoxy groups, such as methoxy or ethoxy radicals.

The polyorganosiloxanes (A) may be liquids or high-viscosity substances. The polyorganosiloxanes (A) preferably have a viscosity of from $10^3$ to $10^8$ mPas at 25° C. It is possible to use a single type of polyorganosiloxane (A), or a mixture composed of at least two different types of polyorganosiloxane (A).

It is preferable that no crosslinking agents are used in the inventive pelletized organopolysiloxane materials. However, for some applications it can be advantageous to use crosslinking agents, for example if linkage of the organopolysiloxane to the thermoplastic is desired. In this case, crosslinking agents preferably used in the pelletized polyorganosiloxanes comprise peroxides such as dibenzoyl peroxide, bis(2,4-dichlorobenzoyl) peroxide, dicumyl peroxide, bis-4-methylbenzoyl peroxide, or 2,5-bis(tert-butylperoxy)-2,5-dimethylhexane, or else mixtures of these peroxides.

The inventive polyorganosiloxanes (A) moreover preferably comprise reinforcing and/or non-reinforcing fillers. Examples of reinforcing fillers are pyrogenic or precipitated silicas with BET surface areas of at least 50 m²/g.

The silica fillers may have hydrophilic properties or may have been hydrophobicized by known processes. Reference may be made to DE 38 39 900 A1, whose disclosure in this respect is incorporated into the present application. In such cases the hydrophobicization is generally carried out using from 1 to 20% by weight of hexamethyldisilazane and/or divinyltetramethyldisilazane and from 0.5 to 5% by weight of water, based in each case on the total weight of the polyorganosiloxane (A). These reagents are advantageously fed to a suitable mixing apparatus, e.g. a kneader or internal mixer, in which there is an initial charge of the polyorganosiloxane (A), prior to gradual incorporation of the hydrophilic silica into the composition.

Examples of non-reinforcing fillers are powdered quartz; diatomaceous earth; calcium silicate; zirconium silicate; zeolites; metal oxide powders such as aluminum oxide, titanium oxide, iron oxide or zinc oxide; barium silicate; barium sulfate; calcium carbonate; gypsum; and polytetrafluoroethylene powder. The fillers may also comprise fibrous components, such as glass fibers or synthetic polymer fibers. The BET surface area of these fillers is preferably less than 50 m²/g.

The amounts of filler (B) present in the pelletized organopolysiloxane materials are preferably from 1 to 200 parts by weight, more preferably from 30 to 100 parts by weight, based on 100 parts by weight of polyorganosiloxane (A).

The pelletized organopolysiloxane materials also comprise an additive (C) for producing a pelletized material from organopolysiloxane. The additive (C) is described in EP 1 028 140 A1, whose disclosure in this respect is incorporated into the present application by way of reference. The additive permits production of a fully free-flowing pelletized organopolysiloxane material. The inventive additive comprises boric acid and water, which is preferably deionized water or relatively high-purity water, and also, where appropriate, fatty acid salts, the amounts of additive added to the organopolysiloxane (A) preferably being from 0.01 to 20% by weight, more preferably from 0.1 to 4% by weight, and most preferably from 0.1 to 2% by weight.

In one preferred embodiment, the inventive pelletizing additive is used in the form of an additive composition comprising an organopolysiloxane. In this preferred embodiment, the amount of boric acid present in the composition of the additive (C) is preferably from 2 to 20% by weight, more preferably from 3 to 14% by weight, and most preferably from 8 to 9% by weight. The organopolysiloxane is preferably a linear organopolysiloxane such as dimethylpolysiloxane, phenylmethylpolysiloxane, vinylmethylpolysiloxane, or trifluoropropylpolysiloxane. Its viscosity measured at 2° C. is preferably from 10 to $10^8$ mPas, more preferably from $10^5$ to $10^8$ mPas. The amount of the organopolysiloxane present in the composition of this preferred embodiment is preferably from 30 to 90% by weight, more preferably from 40 to 80% by weight, and most preferably from 60 to 70% by weight.

Fatty acid salts are preferably present in the pelletizing additive (C). The fatty acid salts preferably comprise salts of the metals Al, Ba, Ca, Cd, Co, Cr, Cu, Fe, Li, Mg, Mn, Ni, Pb, Sn, Sr, Zn with higher fatty, resin, or naphthenic acids, e.g. stearates, palmitates, oleates, linoleates, resinates, laurates, octanoates, ricinoleates, 12-hydroxystearates, naphthenates, tallates, and the like. Preference is given to fatty acids having from more than 12 carbon atoms to 30 carbon atoms, with particular preference being given to fatty acids having from more than 16 carbon atoms to 26 carbon atoms, the stearates being particularly preferred, in particular calcium stearate. The amounts of fatty acid salts present in the composition is preferably from 0.1 to 10% by weight, more preferably from 0.2 to 6% by weight, and most preferably from 0.3 to 4% by weight.

If required by the particular application, additives (D) such as processing aids, e.g. plasticizers, pigments, and stabilizers, e.g. heat stabilizers, and other conventional thermoplastics additives may be added.

Examples of plasticizers which may be used as additives (D) are dipolyorganosiloxanes terminated with trimethylsiloxy groups or with hydroxy groups and having a viscosity of not more than 5000 mm²/s at 25° C., and diphenylsilanediol. The structure of the dipolyorganosiloxanes is preferably composed of dimethylsiloxane units and/or vinylmethylsiloxane units.

Examples of heat stabilizers which may be used as additives (D) are transition metal salts of fatty acids, e.g. iron octoate or cerium octoate, titanium butoxide, transition metal silanolates, such as iron silanolate, cerium(IV) compounds, carbon blacks, or metal oxides or metal oxide hydrates, such as iron oxide or titanium oxide, and mixtures of these. The inventive materials preferably comprise no substances other than these. Each of the components used to prepare the inventive materials may comprise one single type of that component or else a mixture of at least two different types of that component.

Once the individual components of the composition have been combined, the composition is pelletized using conventional means of pelletizing, such as the perforated plate and the rotating knife, giving a fully free-flowing pelletized material. The resultant pelletized organopolysiloxane material has a particle size of from 1 to 100 mm, preferably from 2 to 50 mm. The inventive pelletized organopolysiloxane material preferably has the typical cylindrical structure of a pelletized material, with a diameter which is preferably from 3 to 10 mm, particaularly preferably from 4 to 8 mm, and a height which is preferably from 2 to 10 mm, particularly preferably from 3 to 8 mm. By pellet size of a given length is meant the minimum pellet dimension.

Following the pelletizing process, the pelletized organopolysiloxane material is preferably treated with a powdering agent so as to retain free flowing properties and/or to reduce any tendency to sinter or block. The powdering agent is preferably composed of untreated or surface-treated mineral powders, with particular preference being given to the use of talc.

This invention also provides a process for producing the inventive pelletized organopolysiloxane materials, which comprises mixing, in a mixing apparatus, (A) at least one polyorganosiloxane composed of units of the general formula I:

$$R_rSiO_{(4-r/2)} \qquad (I),$$

where

R independently of one another, are hydrogen or substituted or unsubstituted hydrocarbon radicals, and r is 0, 1, 2 or 3, with the proviso that the average numerical value of r is in the range from 1.9 to 2.1, (B) from 1 to 200 parts by weight, based on 100 parts by weight of the polyorganosiloxane (A), of a reinforcing or non-reinforcing filler, or of a mixture of reinforcing or non-reinforcing fillers, (C) from 0.01 to 20 parts by weight, based on 100 parts by weight of the polyorganosiloxane (A) of at least one boric acid-containing additive for producing pellets, and (D) where appropriate, other auxiliaries which may include processing aids, plasticizers, pigments, and stabilizers, and then pelletizing the mixture to form pelletized organopolysiloxane material.

One preferred embodiment of the production of an inventive pelletized organopolysiloxane material is described below.

100 parts of one or more dipolyorganosiloxane(s) end-capped by trialkylsiloxy groups, most preferably by trimethylsiloxy groups, and composed of from 70 to 100%, more preferably from 90 to 100%, of dimethylsiloxane units, and from 0 to 30%, more preferably from 0 to 10%, of alkenylmethylsiloxane units, most preferably vinylmethylsiloxane units, with a viscosity which is preferably from $10^3$ to $10^8$ mPas at 25° C., more preferably from $10^5$ to $10^8$ mPas at 25° C., are mixed in a kneader operated at from 100 to 250° C., most preferably at from 120 to 200° C., preferably with from 0 to 50 parts, more preferably from 0.1 to 30 parts, of additives (D), and preferably with from 1 to 200 parts, more preferably with from 30 to 100 parts, of one or more reinforcing or non-reinforcing fillers (B), or a mixture of the two, and preferably kneaded for from 10 minutes to 12 hours, more preferably from 30 minutes to 6 hours.

If reinforcing fillers are used, it is preferable to use fumed or precipitated silicas with BET surface areas of at least 50 m²/g, more preferably at least 100 m²/g. If non-reinforcing fillers are used it is preferable to use powdered quartz, diatomaceous earth, calcium silicate, zirconium silicate, zeolites, metal oxide powders and metal oxide hydrate powders, e.g. the oxide or oxide hydrate of aluminum, of titanium, or iron, of magnesium, or of zinc, barium sulfate, calcium carbonate, gypsum, polytetrafluoroethylene powder, glass fibers, or synthetic fibers.

Additives (D) added preferably comprise processing aids, such as plasticizers, pigments, and stabilizers, such as heat stabilizers. In one particularly preferred embodiment, the plasticizers used comprise polydiorganosiloxanes terminated with trimethylsiloxy groups or with hydroxy groups and having a viscosity of not more than 5000 mm²/s at 25° C.

It is then preferable to add from 0.01 to 20% by weight, more preferably from 0.1 to 4% by weight, and most preferably from 0.1 to 2% by weight, of the additive described in EP 1 028 140 A1, and to use conventional means of pelletizing, such as a perforated plate and a rotating knife, to pelletize the material. The perforated plate diameter is preferably from 3 to 10 mm, most preferably from 4 to 8 mm.

Following the pelletizing process, the pelletized organopolysiloxane material is preferably powdered. The powdering agent is preferably composed of untreated or surface-treated mineral powders, and particular preference given to the use of talc.

Another preferred method for producing the pelletized organopolysiloxane material uses heated continuous mixing equipment instead of the kneader. Examples of such continuous mixing equipment includes single and twin screw extruders, roll mills, etc.

The storage stability of the inventive pelletized organopolysiloxane material, during which it can be processed satisfactorily, is preferably at least 6 months.

The invention also provides the use of the pelletized organopolysiloxane material as additive in thermoplastics. Examples of thermoplastics are polyolefins, for example low- and high-density polyethylenes (LDPE, LLDPE, HDPE, homo- and copolymers of propylene (PP) with, for example, ethylene, butene, hexene, and octene, polybutylenes, such as polyisobutylene (PIB), olefin copolymers, e.g. ethylene-methyl acrylate copolymer (EMA) and ethylene-vinyl acetate copolymer (EVA); also polyvinyl chloride (PVC), polymers of vinyl acetate-vinyl chloride (PVCA), and also polystyrenes (PS, HIPS, EPS) and styrene copolymers, for example polymers of acrylonitrile-butadiene-styrene (ABS), acrylate-acrylonitrile-styrene (ASA), and acrylonitrile-styrene (SAN); also engineering plastics, such as polyacetals (POM), polyacrylonitrile (PAN), polyamides (for example PA 6, PA 6.6, PA 12), polycarbonates (PC), polyesters, such as polyethylene terephthalate (PET) and polybutylene terephthalate (PBT), polyacrylates and polymethacrylates, such as polymethyl methacrylate (PMMA), polymers of acrylonitrile-butadiene-methyl methacrylate-styrene (MABS), acrylonitrile-methyl methacrylate (AMMA), acrylate-ethylene (EEA), methyl acrylate-vinyl chloride (VC-MA) and methyl methacrylate-vinyl chloride (VC-MMA), and also polyphenylene ether (PPE), and blends, such as PC/ABS, PC/ASA, PPE/PS, PPE/PA, PBT/PET, PBT/PC, PA/ABS, PA/PP; and also high-performance plastics, such as liquid-crystalline polyester (LCP), polysulfone (PSU), polyphenylene sulfone (PPSU), polyether sulfone (PES), polyphenylene sulfide (PPS), polyimide (PI), polyesterimide (PEI), polyether block amide (PEBA), polyaryl ether ketone (PAEK), polyether ether ketone (PEEK); and also thermoplastic polyurethane (PU) and thermoplastic elastomers (TPE) based on styrene and on olefins (TES, TEO).

The inventive pelletized organopolysiloxane material is incorporated into the thermoplastic using the prior art known to the person skilled in the art. The incorporation process uses an elevated temperature and conventional methods for the dispersion of solid additive constituents into thermoplastics. To this end, by way of example, the pelletized organopolysiloxane material may be preblended with the pelletized thermoplastic material in a dry mixer. Examples of equipment suitable for the subsequent incorporation process are single-screw and twin-screw extruders for the continuous incorporation process, or kneaders for the batchwise incorporation process. The temperature and other conditions for the incorporation process depend on the particular thermoplastic and are known to the person skilled in the art or can be determined via routine experiments; the incorporation temperatures are generally between the softening point and the decomposition temperature of the thermoplastic. After incorporation at an elevated temperature in suitable processing equipment, the resultant compounded material may be further processed, using conventional techniques, for example via injection molding, blow molding, compression molding, or vacuum thermoforming, in order to produce appropriate plastics items.

The amounts of the inventive pelletized organopolysiloxane material added as additive are preferably from 0.05 to 50% by weight, more preferably from 0.1 to 30% by weight, based on the weight of the thermoplastic. Addition of the pelletized organopolysiloxane material achieves processing advantages and improvements in the surface properties of the plastics items; among these, by way of example, are reduction of torque, better throughput, reduced wear, and also lower energy consumption during processing; also better processability, lower melt viscosity, better demoldability, lower rejection rate, and faster cycles during shaping processes; also lower coefficient of friction, better slip properties, better abrasion resistance, better combustion performance combined with better flame-retardancy properties, and also better scratch resistance and surface gloss, for the compounded materials and the moldings.

EXAMPLE 1

Production of Pelletized Organopolysiloxane Material 100 parts of a diorganopolysiloxane end-capped by trimethylsiloxy groups and composed of from 70 to 100 mol % of dimethylsiloxane units and from 0 to 30 mol % of vinylmethylsiloxane units, with a viscosity of from $10^5$ to $10^8$ mPas at 25° C. are treated, in a kneader operated at from 120 to 200° C., with 10 parts of a dipolyorganosiloxane terminated by hydroxy groups and composed of dimethylsiloxane units and vinylmethylsiloxane units, with a viscosity of from 1000 to 5000 mm$^2$/s at 25° C., and also with 35 parts of silicon dioxide produced pyrogenically in the gas phase, with a surface area of 300 m$^2$/g, and with 18 parts of silicon dioxide produced pyrogenically in the gas phase with a surface area of 150 m$^2$/g, and are kneaded for 2 hours. The mixture is then treated with 0.13 part of boric acid and 0.3 part of deionized water, and kneaded for a further 3 hours at 150° C., whereupon the water serving as solvent for boric acid is removed, and the material is then processed to give a fully free-flowing pelletized organopolysiloxane material. The manufacturing equipment used for this purpose is an extruder with a rotating knife on the die head. Following the pelletizing process, the pelletized organopolysiloxane material is powdered with talc. The pellet structure of the resultant pelletized organopolysiloxane material is uniform and cylindrical with a diameter of about 3 mm and a height of from 2 to 4 mm.

COMPARATIVE EXAMPLE C1

Example 1 is repeated, but without treatment of the mixture with boric acid and deionized water. The resultant organopolysiloxane cannot be pelletized, instead sticking to the perforated plate and knife.

EXAMPLE 2

Production of Pelletized Organopolysiloxane Material 100 parts of a diorganopolysiloxane end-capped by trimethylsiloxy groups and composed of from 70 to 100 mol % of dimethylsiloxane units and from 0 to 30 mol % of vinylmethylsiloxane units, with a viscosity of from $10^5$ to $10^8$ mPas at 25° C. are treated, in a kneader operated at from 120 to 200° C., with 15 parts of a dipolyorganosiloxane terminated by hydroxy groups and composed of dimethylsiloxane units and vinylmethylsiloxane units, with a viscosity of from 10 to 1000 mm$^2$/s at 25° C., with 0.13 part of boric acid and 0.3 part of deionized water, and then with 30 parts of silicon dioxide produced pyrogenically in the gas phase with a surface area of 300 m$^2$/g, and with 30 parts of silicon dioxide produced pyrogenically in the gas phase, with a surface area of 150 m$^2$/g, and are kneaded at 150° C. for 3 hours, whereupon the water serving as solvent for the boric acid is removed. The mixture is then processed to give a fully free-flowing pelletized organopolysiloxane material. The manufacturing equipment used for this purpose is an extruder with a rotating knife on the die head. Following the pelletizing process, the pelletized organopolysiloxane material is powdered with talc. The pellet structure of the resultant pelletized organopolysiloxane material is uniform and cylindrical with a diameter of about 5 mm and a height of from 4 to 7 mm.

COMPARATIVE EXAMPLE C2

Inventive example 2 is repeated, but without treatment of the mixture with boric acid and deionized water. The resultant organopolysiloxane cannot be pelletized, instead sticking to the perforated plate and knife.

EXAMPLE 3

Production of Pelletized Organopolysiloxane Material 100 parts of a diorganopolysiloxane end-capped by trimethylsiloxy groups and composed of from 70 to 100 mol % of dimethylsiloxane units and from 0 to 30 mol % of vinylmethylsiloxane units, with a viscosity of from $10^5$ to $10^8$ mPas at 25° C. are treated, in a kneader operated at from 120 to 200° C., with 14 parts of a dipolyorganosiloxane terminated by hydroxy groups and composed of dimethylsiloxane units and vinylmethylsiloxane units, with a viscosity of from 10 to 1000 mm$^2$/s at 25° C., and also with 10 parts of silicon dioxide produced pyrogenically in the gas phase, with a surface area of 300 m$^2$/g, and with 41 parts of silicon dioxide produced pyrogenically in the gas phase, with a surface area of 200 m$^2$/g, and are kneaded for 2 hours. The mixture is treated with 1.5% of an additive for whose preparation 100 parts of a dimethylpolysiloxane with a viscosity of from $6·10^6$ to $8·10^6$ mPas at 25° C. are mixed in a kneader with 13 parts of boric acid, 46 parts of silicon dioxide produced pyrogenically in the gas phase with a surface area of 150 m$^2$/g, and also with 5 parts of calcium stearate, and 30 parts of deionized water, and kneaded for 3 hours at 150° C. under nitrogen, thus drawing off the water serving as solvent for the boric acid, and then processed to give a fully free-flowing pelletized organopolysiloxane material. The manufacturing equipment used for this purpose is an extruder with a rotating knife on the die head. Following the pelletizing process, the pelletized organopolysiloxane material is powdered with talc. The pellet structure of the resultant pelletized organopolysiloxane material is uniform and cylindrical with a diameter of about 6 mm and a height of from 4 to 7 mm.

COMPARATIVE EXAMPLE C3

Inventive example 3 is repeated, but without adding the additive prepared from dimethylpolysiloxane, boric acid, silicon dioxide, calcium stearate, and deionized water. The resultant organopolysiloxane cannot be pelletized, instead sticking to the perforated plate and knife.

EXAMPLE 4

Preparation of Compounded Materials from Thermoplastic and Pelletized Organopolysiloxane Material For the experiments in inventive example 4, use is made of the pelletized organopolysiloxane material from inventive example 3. Table 1 describes the constitution of the compounded materials prepared.

The following thermoplastics are used:
Low-density polyethylene (LDPE): Lupolen™ 2420 H (Basell)
High-density polyethylene (HDPE): Lupolen™ 5031 L (Basell)
Polypropylene (PP): Moplen™ HP 456H (Basell).

To prepare the compounded materials, pelletized plastics material and pelletized organopolysiloxane material are first mixed in the quantitative proportions of table 1 and then extruded in a corotating twin-screw extruder (ZE 25, Berstorff). The parameters for this process are described below:
throughput: 5 kg/hour
screw rotation rate: 400 rpm
L/D ratio: 33 D
Temperature profile for LDPE and HDPE: from 110° C. to 200° C., 6 heating zones
Temperature profile for PP: from 220° C. to 240° C., 6 heating zones.

TABLE 1

Constitution of compounded materials prepared:

| Compounded material | Proportion of thermoplastic | Proportion of pelletized organopolysiloxane material |
|---|---|---|
| 1 | 99.27% by wt. of LDPE | 0.73% by wt. |
| 2 | 99.27% by wt. of HDPE | 0.73% by wt. |
| 3 | 98.55% by wt. of LDPE | 1.45% by wt. |
| 4 | 98.55% by wt. of HDPE | 1.45% by wt. |
| 5 | 98.55% by wt. of PP | 1.45% by wt. |
| 6 | 92.75% by wt. of LDPE | 7.25% by wt. |
| 7 | 92.75% by wt. of HDPE | 7.25% by wt. |
| 8 | 92.75% by wt. of PP | 7.25% by wt. |
| 9 | 85.5% by wt. of LDPE | 14.5% by wt. |
| 10 | 85.5% by wt. of HDPE | 14.5% by wt. |
| 11 | 85.5% by wt. of PP | 14.5% by wt. |

EXAMPLE 5

Determination of Torque for Compounded Materials Composed of Thermoplastic and Pelletized Organopolysiloxane Materials (Torque Reduction via Addition of Pelletized Organopolysiloxane Material)

Torque is determined in a single-screw extruder (Goettfert). The process parameters are described below:
Fill level: 100%; throughput: variable
Screw rotation rate: 30 rpm
L/D ratio: 30 D
Temperature profile from 160° C. to 200° C.; 4 heating zones
Running time: 30 minutes per compounded material or thermoplastic The results are described in table 2. The torque for the compounded material here is based on the torque for the respective thermoplastic without addition of pelletized organopolysiloxane material (100%), and is stated in % (based on 100%).

TABLE 2

Torque reduction via addition of pelletized organopolysiloxane material

| Compounded material | Proportion of thermoplastic | Proportion of pelletized organopolysiloxane material | Torque |
|---|---|---|---|
| LDPE | 100% by wt. of LDPE | 0% by wt. | 100% |
| 1 | 99.27% by wt. | 0.73 by wt. | 43% |
| HDPE | 100% by wt. of HDPE | 0% by wt. | 100% |
| 2 | 99.27% by wt. | 0.73% by wt. | 87% |

TABLE 2-continued

Torque reduction via addition of pelletized organopolysiloxane material

| Compounded material | Proportion of thermoplastic | Proportion of pelletized organopolysiloxane material | Torque |
|---|---|---|---|
| | of HDPE | | |

EXAMPLE 6

Determination of Melt Flow Rate of Compounded Materials Composed of Thermoplastic and Pelletized Organopolysiloxane Material to EN ISO 1133

Melt flow rate is determined in a melt index tester (Goettfert) to EN ISO 1133. Each measurement uses 6 g of compounded material or thermoplastic. The results are described in table 3. The process parameters are listed below:
Barrel temperature: 190° C.
Heating time: 4 minutes
Specified load: 21.6 kg

TABLE 3

Melt index of thermoplastics and of compounded materials composed of thermoplastic and pelletized organopolysiloxane material

| Compounded material | Proportion of thermoplastic | Proportion of pelletized organopolysiloxane material | Melt index (MFI) in g/10 min |
|---|---|---|---|
| LDPE | 100% by wt. of LDPE | 0% by wt. | 129 |
| 3 | 98.55% by wt. of LDPE | 1.45% by wt. | 136 |
| 6 | 92.75% by wt. of LDPE | 7.25% by wt. | 150 |
| HDPE | 100% by wt. of HDPE | 0% by wt. | 258 |
| 4 | 98.55% by wt. of HDPE | 1.45% by wt. | 278 |
| 7 | 92.75% by wt. of HDPE | 7.25% by wt. | 292 |

EXAMPLE 7

Determination of Abrasion Resistance of Compounded Materials Composed of Thermoplastic and Pelletized Organopolysiloxane Material by the Abrasion Wheel Method Based on DIN 53 754

Abrasion resistance is determined by a method based on DIN 53 754 on a TABER ABRASER 5131 (Erichsen) abrader-wheel device. The results are described in table 4. To produce the test specimens, pressed sheets of thickness 2 mm are produced from the compounded materials nos. 3-8, and also from LDPE, HDPE, and PP. Circular test specimens with a diameter of 90 mm and with an internal core diameter of 7 mm are stamped out of these pressed sheets. The test parameters are listed below:
Number of rotations: 200
Load 5.4±0.2 N per abrader wheel (2 abrader wheels)
Abrader wheel set: H-18 CALIBRADE abrader wheel set

TABLE 4

Abrasion resistance of thermoplastics and of compounded materials composed of thermoplastic and pelletized organopolysiloxane material

| Compounded material | Proportion of thermoplastic | Proportion of pelletized organopolysiloxane material | Abrasion in mg |
|---|---|---|---|
| LDPE | 100% by wt. of LDPE | 0% by wt. | 19.9 |
| 3 | 98.55% by wt. of LDPE | 1.45% by wt. | 7.9 |
| 6 | 92.75% by wt. of LDPE | 7.25% by wt. | 7.4 |
| HDPE | 100% by wt. of HDPE | 0% by wt. | 12.4 |
| 4 | 98.55% by wt. of HDPE | 1.45% by wt. | 7.2 |
| 7 | 92.75% by wt. of HDPE | 7.25% by wt. | 1.8 |
| PP | 100% by wt. of PP | 0% by wt. | 21.1 |
| 5 | 98.55% by wt. of PP | 1.45% by wt. | 19 |
| 8 | 92.75% by wt. of PP | 7.25% by wt. | 12.8 |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A pelletized organopolysiloxane material comprising a uniform dispersion of
   (A) at least one polyorganosiloxane composed of units of the formula I:

$$R_rSiO_{(4-r/2)} \tag{I}$$

where
   R independently of one another, are hydrogen, or optionally substituted hydrocarbon radicals, and
   r is 0, 1, 2 or 3, with the proviso that the average numerical value of r is in the range from 1.9 to 2.1,
   (B) from 1 to 200 parts by weight, based on 100 parts by weight of the polyorganosiloxane (A), of a reinforcing or non-reinforcing filler, or of a mixture of reinforcing or non-reinforcing fillers, and
   (C) from 0.01 to 20 parts by weight, based on 100 parts by weight of the polyorganosiloxane (A) of at least one boric acid-containing additive for producing pellets, said additive consisting essentially of boric acid, water, and optionally fatty acid salt, the boric acid having been supplied to the composition dissolved in water, the water optionally removed prior to pelletizing, and whose pellet size is from 1 to 100 mm.

2. A pelletized organopolysiloxane material comprising a uniform dispersion of
   (A) at least one polyorganosiloxane composed of units of the formula I:

$$R_rSiO_{(4-r/2)} \tag{I}$$

where
   R independently of one another, are hydrogen, or optionally substituted hydrocarbon radicals, and
   r is 0, 1, 2 or 3, with the proviso that the average numerical value of r is in the range from 1.9 to 2.1, (B) from 1 to 200 parts by weight, based on 100 parts by weight of the polyorganosiloxane (A), of a reinforcing or non-reinforcing filler, or of a mixture of reinforcing or non-reinforcing fillers, and (C) from 0.01 to 20 parts by weight, based on 100 parts by weight of the polyorganosiloxane (A) of at least one additive for producing pellets, said additive comprising boric acid and optionally fatty acid salt, the boric acid having been supplied to the composition dissolved in water, the water optionally removed prior to pelletizing, and whose pellet size is from 1 to 100 mm, wherein the polyorganosiloxanes (A) further contain diorganosiloxane units, in which one or more of the alkyl groups of the formula (I) have been replaced by hydroxy groups or by alkoxy groups, the end groups of which have been selected from the group consisting of trialkylsiloxy groups, trimethylsiloxy radical, dimethylhydroxysiloxy radical, and dimethylvinylsiloxy radical.

3. The pelletized organopolysiloxane material of claim 1, wherein the polyorganosiloxanes (A) comprise liquids or high-viscosity substances.

4. The pelletized organopolysiloxane material of claim 1, further comprising at least one dipolyorganosiloxane terminated with trimethylsiloxy groups or with hydroxy groups and having a viscosity of not more than 5000 mm²/s at 25° C., or diphenylsilanediol, as a plasticizer.

5. The pelletized organopolysiloxane material of claim 1, wherein said additive (C) includes at least one fatty acid salt.

6. The pelletized organopolysiloxane (C), further comprising at least one auxiliary selected from the group consisting of processing aids, plasticizers, pigments, and stabilizers.

7. The pelletized organopolysiloxane mixture of claim 1, consisting essentially of a dispersion of (A) at least one polyorganosiloxane composed of units of the formula I:

$$R_rSiO_{(4-r/2.)}$$ (I), where

R independently of one another, are hydrogen, or optionally substituted hydrocarbon radicals, and r is 0, 1, 2 or 3, with the proviso that the average numerical value of r is in the range from 1.9 to 2.1, (B) from 1 to 200 parts by weight, based on 100 parts by weight of the polyorganosiloxane (A), of a reinforcing or non-reinforcing filler, or of a mixture of reinforcing or non-reinforcing fillers, and (C) from 0.01 to 20 parts by weight, based on 100 parts by weight of the polyorganosiloxane (A) of at least one additive for producing pellets, and (D) optionally auxiliary selected from the group consisting of processing aids, plasticizers, pigments, and stabilizers.

8. The pelletized organopolysiloxane material of claim 1, having a cylindrical pellet structure with a diameter of from 3 to 10 mm and a height of from 2 to 10 mm.

9. The pelletized organopolysiloxane material of claim 1, wherein, following the pelletizing process, the pelletized organopolysiloxane material is coated with a powder.

10. A process for producing a pelletized organopolysiloxane material of claim 1, which comprises mixing, in a mixing apparatus, (A) at least one polyorganosiloxane composed of units of the formula I:

$$R_rSiO_{(4-r/2)}$$ (I)

where

R independently of one another, are hydrogen or an optionally substituted hydrocarbon radical, and r is 0, 1, 2 or 3, with the proviso that the average numerical value of r is in the range from 1.9 to 2.1, (B) from 1 to 200 parts by weight, based on 100 parts by weight of the polyorganosiloxane (A), of a reinforcing or non-reinforcing filler, or of a mixture of reinforcing or non-reinforcing fillers, (C) from 0.01 to 20 parts by weight, based on 100 parts by weight of the polyorganosiloxane (A) of at least one additive for producing pellets, said additive comprising boric acid, water, and optionally fatty acid salt, and (D) optionally, other auxiliaries selected from the group consisting of processing aids, plasticizers, pigments, and stabilizers, and then pelletizing to form the pelletized organopolysiloxane material.

11. A process for producing an organopolysiloxane-modified thermoplastic, comprising:

(A) adding to a mixer or extruder, pellets of at least one thermoplastic to be modified;

(B) adding to said mixer or extruder, pellets of the pelletized organopolysiloxane material comprising a uniform dispersion of (A) at least one polyorganosiloxane composed of units of the formula I:

$$R_rSiO_{(4-r/2)}$$ (I), where

R independently of one another, are hydrogen, or optionally substituted hydrocarbon radicals, and r is 0, 1, 2 or 3, with the proviso that the average numerical value of r is in the range from 1.9 to 2.1, (B) from 1 to 200 parts by weight, based on 100 parts by weight of the polyorganosiloxane (A), of a reinforcing or non-reinforcing filler, or of a mixture of reinforcing or non-reinforcing fillers, and (C) from 0.01 to 20 parts by weight, based on 100 parts by weight of the polyorganosiloxane (A) of at least one additive for producing pellets, said additive comprising boric acid and optionally fatty acid salt, the boric acid having been supplied to the composition dissolved in water, the water optionally removed prior to pelletizing, and whose pellet size is from 1 to 100 mm; and (C) mixing said thermoplastic(s) and said organopolysiloxane in the melt to form an organopolysiloxane-modified thermoplastic.

12. The process of claim 11, wherein said organopolysiloxane is present in an amount of from 0.1 to 30 weight percent based on the weight of the thermoplastic.

13. The process of claim 11, wherein an extruder is employed, and wherein said thermoplastic pellets and said organopolysiloxane pellets are mixed together prior to entry into said extruder.

14. A pelletized organopolysiloxane material comprising a uniform dispersion of (A) at least one liquid polyorganosiloxane composed of units of the formula I:

$$R_rSiO_{(4-r/2)}$$ (I), where

R independently of one another, are hydrogen, or optionally substituted hydrocarbon radicals, and r is 0, 1, 2 or 3, with the proviso that the average numerical value of r is in the range from 1.9 to 2.1, (B) from 1 to 200 parts by weight, based on 100 parts by weight of the polyorganosiloxane (A), of a reinforcing or non-reinforcing filler, or of a mixture of reinforcing or non-reinforcing fillers, and (C) from 0.01 to 20 parts by weight, based on 100 parts by weight of the polyorganosiloxane (A) of at least one additive for producing pellets, said additive comprising boric acid and optionally fatty acid salt, the boric acid having been supplied to the composition dissolved in water, the water optionally removed prior to pelletizing, and whose pellet size is from 1 to 100 mm.

15. The pelletized organopolysiloxane material of claim 14, wherein said polyorganosiloxane has a viscosity of $10^3$ mPa·s to $10^6$ mPa·s.

16. The pelletized organopolysiloxane material of claim 14, wherein said additive consists essentially of boric acid, water, and optionally fatty acid salt.

17. The pelletized organopolysiloxane material of claim 16, wherein said additive is present in an amount of from 0.1 to 4 weight percent.

18. The pelletized organopolysiloxane material of claim 1, wherein said additive is present in an amount of from 0.1 to 4 weight percent.

19. The pelletized organopolysiloxane material of claim 1, wherein said additive is present in an amount of from 0.1 to 2 weight percent.

* * * * *